United States Patent [19]

Lucherini

[11] 4,399,384
[45] Aug. 16, 1983

[54] SEALED-TYPE D.C. ELECTRIC MOTOR HAVING REDUCED DIAMETRICAL BULK

[76] Inventor: Guido Lucherini, Via Caboto 3, Milano, Italy

[21] Appl. No.: 186,206

[22] Filed: Sep. 10, 1980

[30] Foreign Application Priority Data

Oct. 4, 1979 [IT] Italy .............................. 22763[U]/79

[51] Int. Cl.³ .......................................... H01R 39/44
[52] U.S. Cl. ..................................... 310/241; 310/42; 310/230; 310/245; 310/247
[58] Field of Search ............... 310/231, 237, 154, 237, 310/152, 241, 245, 247, 42, 230

[56] References Cited

U.S. PATENT DOCUMENTS

| 1,315,796 | 9/1919 | Scott | 310/237 |
| 3,440,465 | 4/1969 | Pratt et al. | 310/230 |
| 3,663,851 | 5/1972 | Persson | 310/154 |
| 3,681,550 | 8/1972 | Perry et al. | 310/230 |
| 4,237,393 | 12/1980 | Landgraf | 310/154 |

FOREIGN PATENT DOCUMENTS 582546 12/1977 U.S.S.R. .............................. 310/237

Primary Examiner—J. D. Miller
Assistant Examiner—D. L. Rebsch
Attorney, Agent, or Firm—Charles E. Brown

[57] ABSTRACT

A rotor for a D.C. electric motor is disclosed, in which the rotor has a frontally arranged collector on which brushes are active, which are oriented parallel to the rotor axis. This arrangement considerably reduces the diametrical bulk of the motor. The brush angle is adjustable by means of an annular ring, internally threaded to the yoke.

5 Claims, 1 Drawing Figure

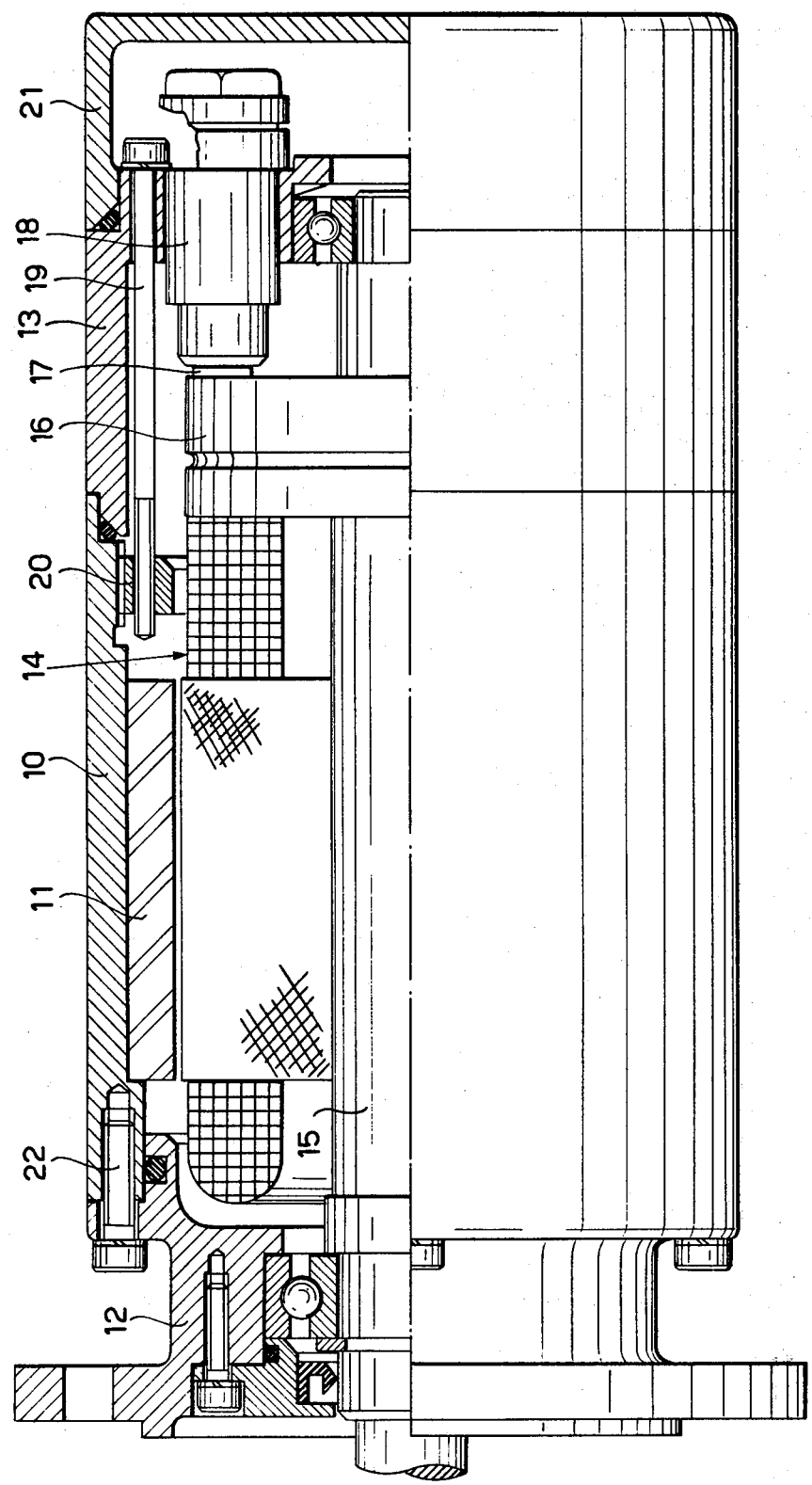

SEALED-TYPE D.C. ELECTRIC MOTOR HAVING REDUCED DIAMETRICAL BULK

This invention relates to improvements in or relating to the structural configuration of D.C. electric motors, so as to permit limiting their diametrical bulk, while simultaneously improving the ease of assembly and the possibility of making the motor seal more effective.

The stator magnetic field of D.C. motors is obtained, in the most recent constructural arrangements, especially for quite special uses, by utilizing permanent magnets having a very high specific coercive force, so that they have the shape of tile-like structures of a small thickness, formed as a single piece or as a composite, and this construction considerably reduces the outside diameter of the motor yoke. The possibility of drastically reducing the motor transverse dimension is, however, incompatible with the conventional structure configuration of the D.C. motor, which is generally conceived on the basis of having yokes capable of housing field magnets presenting considerable radial bulk.

For example, the conventional structure of end shields assembled by tie rods, with the yoke being inserted therebetween, and one of the end shields carrying radially projecting motor brushes, imposed necessary raidal dimensions for the housing rotor collector having an adequate circumferential length, brushes having a sufficient length and urging springs of such a length as to provide the necessary resiliency characteristics even when the brush length is varied due to wear.

The basis of this invention lies in the fact that the compulsory radial dimension for collector components is larger than the dimension now required for the yoke to house the permanent magnets. Merely dimensional corrective expedients are not advisable. In fact, a reduction of the size of the cylindrical collector jeopardizes the electric performance of the motor from many points of view, such as for example when the number of the segments is restricted and the commutator angular width is widened. The reduction of the brush length require more freqeuency brush replacement and this is one of the most objectionable defects of this type of collector motor.

The invention thus relates to the construction of motors which may take full advantage, from a dimensional standpoint, of the use of the permanent magnets aforesaid as described above, and this advantage is achieved not only without sacrificing the electric performances of the motor, but, conversely, while attaining a number of considerable fringe benefits.

These benefits are obtained according to the invention, by providing a D.C. electric motor having permanent stator magnets, which is characterized in that the rotor is provided with a front collector on which brushes are operative, and which bushes are mounted longitudinally on an end shield.

An exemplary embodiment of the invention is shown in the single figure of the accompanying drawing in which there is illustrated a D.C. electric motor shown in side elevational view with parts in cross-section.

By way of a example only, D.C. electric motor according to this invention is essentially composed of a yoke 10 having a substantially cylindrical outline and supporting stator permanent magnets 11 and shields 12 and 13 are applied to the ends of the yoke 10 and a shaft 15 of a rotor 14 is supplied for rotation by appropriate bearings. The rotor 14, which is quite conventional as regards the structure of the armature wound thereon, has a front collector 16 the diameter of which is only slightly different from that of the armature unit, with frontally arranged segments: i.e. segments arranged in a plane perpendicular to the axis of the shaft 15. Electric current is fed to the collector via brushes 17, which are slidably received longitudinal brush-holders 18. The brush holders are mounted on the end shield 13 which are cup-shaped and fastened to the yoke by tie rods 19. The screw-threaded end of each tie rod 19 is screwed into bores of a ring 20, which in turn, is threadedly to the inside of the yoke. The end shield is sealed by a lid 21.

The presence of the segmental front collector, the segments of which are just frontally located, and thus the longitudinal orientation of the brushes and the brush-holders, are such as to provide an average diameter for the annular zone in which the brushes are disposed which is within the diameters of the yoke and the end shield 13.

Fastening the end shield 13 to the yoke 10 with the ring 20 affords two concurring advantages, viz.: in the first place the presence of the inserted ring permits the elimination of any thickening of the yoke, at least as to what is required for the formation of the seats for the set screws, and for the tie rods 22 which hold the end shield 12. In addition, it becomes very convenient to adjust the angular position of the brush-holding end shield 13, which, with the tie rods 19 loosened, can be rotated with the ring 20 relative to the yoke commutator 16. When the tie rods 19 are then tightened, they lock the component parts in position.

It should also be noted that the axial position of the brush-holders mounted on the end shield 13 makes it very convenient to shield the brush-holders from environmental adverse factors by positioning a single lid 21 instead of individual shield members for every brush-holder.

In accordance with the foregoing, the objects of this invention are achieved by reducing all the diametrical bulk of the motor, particularly the diameter of the brush-holding shield together with an improved construction and assembly of the components.

It will be observed that, by virtue of the motor configuration of this invention, it becomes possible, at the mere expense of a slight percentage increase of the length of the motor to achieve a considerable percentage increase of the length of the brushes, and consequently of the brush service life.

The invention is not limited to being threadedly fastened to the yoke, but any other kind axial connection of the ring to the yoke which permits the rotation of the ring until the tie rods which are screwed to the ring are tightened, may be provided.

I claim:

1. A D.C. electric motor comprising a stator yoke, a first end shield secured to one end of said yoke, a second end shield secured to the opposite end of said yoke, thin permanent stator magnets fixedly carried to said yoke, an armature rotatably journalled in said end shields in cooperating relation to said stator magnets, said armature having a collector at one end thereof facing an adjacent one of said end shields in axially opposed relation, brushes carried by said one end shield for axial movement relative to said one shield to engage said collector, and mounting means mounting said one end shield for rotation about the axis of said armature for rotationally positioning said brushes relative to said stator magnets, said mounting means including a mounting ring threadedly rotationally secured to the interior of said yoke adjacent longitudinal ends of said stator magnets, and longitudinal tie members extending between said one end shield and said ring, and a screw threaded connection between the interior of said yoke and said ring whereby said ring is interlocked with said yoke against longitudinal displacement relative to said yoke when threadably rotationally positioned.

2. An electric motor according to claim 1 wherein said ring generally lies within an axial projection of said magnets.

3. An electric motor according to claim 1 wherein said ring generally lies within an axial projection of said magnets and encircles a portion of said armature.

4. An electric motor according to claim 1 wherein said one end shield includes a body portion sealed with and forming an extension of said yoke.

5. An electric motor according to claim 1 wherein there is an end cap sealingly engaging said one shield.

* * * * *